United States Patent [19]
Ulrich

[11] Patent Number: 5,130,360
[45] Date of Patent: Jul. 14, 1992

[54] STABILIZED POLYESTERS AND POLYESTER URETHANES CONTAINING AN AROMATIC CARBODIIMIDE AND A QUINONE

[75] Inventor: Volker Ulrich, Schriesheim, Fed. Rep. of Germany

[73] Assignee: Rhein Chemie Rheinau GmbH, Mannheim, Fed. Rep. of Germany

[21] Appl. No.: 674,399

[22] Filed: Mar. 25, 1991

[30] Foreign Application Priority Data

Apr. 5, 1990 [DE] Fed. Rep. of Germany ....... 4010959

[51] Int. Cl.$^5$ .............................. C08K 5/29; C08K 5/13
[52] U.S. Cl. .................................... 524/195; 524/325; 524/340; 524/347; 524/367; 524/375
[58] Field of Search ............... 524/195, 347, 375, 367, 524/325, 340

[56] References Cited

U.S. PATENT DOCUMENTS

| 3,852,101 | 12/1974 | Batchelor | 524/195 |
| 4,064,103 | 12/1977 | Cordes et al. | 524/195 |
| 4,952,621 | 8/1990 | Bandlish | 524/195 |

FOREIGN PATENT DOCUMENTS

1387778 of 1964 France.
0110992 of 1979 Japan.

*Primary Examiner*—Paul R. Michl
*Assistant Examiner*—Tae H. Yoon
*Attorney, Agent, or Firm*—Connolly and Hutz

[57] ABSTRACT

Polyesters and polyester urethanes are stabilized against discoloration and hydrolytic degradation by inclusion therein of an aromatic carbodiimide and either a benzohydroquinone or a naphthohydroquinone compound, and at the same time, the quantity of isocyanate eliminated from polyester urethanes is considerably reduced.

1 Claim, No Drawings

STABILIZED POLYESTERS AND POLYESTER URETHANES CONTAINING AN AROMATIC CARBODIIMIDE AND A QUINONE

This invention relates to polyesters and polyester urethanes which are stabilized against discoloration or hydrolytic degradation. At the same time, the quantity of isocyanate eliminated from polyester urethanes is considerably reduced.

It is known that aromatic polycarbodiimides can be added to polyesters and polyester urethanes to protect them against hydrolytic degradation. Processing temperatures of up to 300°C. occur in the processing of these thermoplastic or elastomeric materials, for example by injection molding and/or extrusion. The aromatic carbodiimides decompose at those temperatures and discolor the plastics in which they are present.

It has been found that this discoloration may be avoided by the addition of small quantities of benzohydroquinone or naphthohydroquinone derivatives in addition to the aromatic polycarbodiimides.

Accordingly, the present invention relates to polyesters and polyester urethanes stabilized against hydrolysis and discoloration which contain as stabilizers from 0.5 to 4% by weight, based on polyesters or polyester urethanes, of an aromatic carbodiimide and from 0.01 to 1.5% by weight of a benzoquinone or naphthoquinone derivative.

Polyesters in the context of the present invention are polyethylene terephthalate, polybutylene terephthalate and thermoplastic polyether ester elastomers. Polyester urethanes in the context of the present invention are urethanes which, in addition to polyether bonds, contain hydrolyzable polyester bonds, for example of adipic acid and ethylene oxide and/or propylene oxide or butane diol.

Aromatic polycarbodiimides in the context of the present invention are 2,2',6,6'-tetraisopropyl diphenyl carbodiimide, homopolymeric carbodiimides of 1,3,5-triisopropyl-2,4-diisocyanatobenzene and heteropolymeric carbodiimides based on 1,3,5-triisopropyl-2,4-diisocyanatobenzene and 2,6-diisopropyl phenyl isocyanate or mixtures thereof being particularly preferred. Benzohydroquinone or naphthoquino-hydroquinone derivatives are, in particular, compounds corresponding to general formulae (I) and (II)

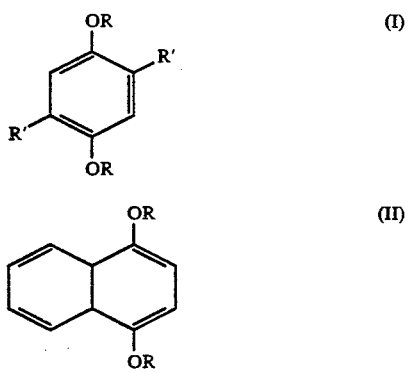

wherein
R represents hydrogen or $C_{1-4}$ alkyl and
R' represents $C_{1-4}$ alkyl.

Preferred benzohydroquinone and naphthohydroquinone derivatives include 2,5-di-tert. butyl 1,4-benzohydroquinone and 2-tert. butyl 1,4-benzohydroquinone.

The materials according to the present invention stabilized against hydrolysis and discoloration may be produced as follows:

The polyester having an H$_2$O content of $\leq 0.03\%$, the aromatic carbodiimide and the hydroquinone derivative are mixed together at room temperature and extruded in a twin-screw extruder at the melting temperature of the polyester. Alternatively, the materials may be separately introduced into the kneading zone of the extruder and then homogeneously distributed in the melt. After extrusion, the melt is cooled, granulated and dried. The granules obtained have an H$_2$O content of $\leq 0.03\%$.

The use of a stabilizer of the type mentioned above prevents discoloration of the polyester and considerably reduces the quantity of isocyanate eliminated from this system by heating.

EXAMPLE

Polyethylene terephthalate and an aromatic carbodiimide are mixed with one another and extruded both with and without a stabilizer. The samples are then dried for 1 h at 80° C. To measure the elimination of isocyanate, the granules are heated in a closed container for the period of time indicated. The quantity of isocyanate eliminated is determined by GC against standard.

Formulations:
1. 98% polyethylene terephthalate, 2% 2,2',6,6'-tetraisopropyl diphenyl carbodiimide
2. 98% polyethylene terephthalate, 2% heteropolymeric carbodiimide of 1,3,5-triisopropyl-2,4-diisocyanatobenzene and 2,6-diisopropylphenyl isocyanate
3. 97.9% polyethylene terephthalate 86, 2% heteropolymeric carbodiimide of 1,3,5-triisopropyl-2,4-diisocyanatobenzene and 2,6-diisopropylphenyl isocyanate, 0.1% 2,5-ditert-butyl-1,4-benzohydroquinone stabilizer

| | | 1 | 2 | 3 |
|---|---|---|---|---|
| Measurement A. Unground cylindrical granules, 3.5 × 3.5 mm | | | | |
| 3 h/160° C. | | | | |
| 2,6-Diisopropyl phenyl isocyanate | ppm | 600 | 55 | 50 |
| 1,3,5-Triisopropyl-2,4-diisocyanatobenzene | | — | 360 | 115 |
| 4 h/150° C. | | | | |
| 2,6-Diisopropyl phenyl isocyanate | ppm | 170 | 30 | 20 |
| 1,3,5-Triisopropyl-2,4-diisocyanatobenzene | | — | 200 | 15 |
| Measurement B. Ground granules, particle size approx. 2 mm³ | | | | |
| 4 h/150° C. | | | | |
| 2,6-Diisopropyl phenyl isocyanate | ppm | 1300 | 140 | 90 |
| 1,3,5-Triisopropyl-2,4-diisocyanatobenzene | | — | 600 | 110 |

EXAMPLE 1

97.47 g polyethylene terephthalate, 2.5 g (aromatic heteropolymeric carbodiimide reaction product of 1,3,5-triisopropyl-2,4-diisocyanatobenzene and 2,6-diisopropylphenyl isocyanate) and 0.03 g 2,5-di-tert. butyl (1,4-benzohydroquinone) are processed to a molding compound by initially mixing the carbodiimide and the benzoquinone derivative and then extruding the mixture with the polyethylene terephthalate in a twin-screw extruder at from 230 to 300° C. This material shows no discolouration, even after prolonged exposure to temperatures of from 230 to 300° C. or during crystallization.

EXAMPLE 2

84.7 g polyethylene terephthalate, 15.0 g (aromatic polycarbodiimide) and 0.3 g (benzoquinone derivative) are mixed as in Example 1. The compound obtained has the following properties:
Density approx. 1.1 g/cm³
Crystallite Mp. approx. 250° C.
$N_2$ content $\geq$ 0.25%

Moldings produced from this material are distinctly less discolored than a molding which has not been stabilized with an antioxidant. The following differences are determined by the CIELAB color measuring method:
DL=9-10
DA=2-4
DB=4-5

I claim:

1. Polyesters and polyester urethanes stabilized against hydrolysis, discoloration and elimination of isocyanates, characterized in that they contain from 0.5 to 4% by weight, based on polyesters and polyester urethanes, of an aromatic carbodiimide and from 0.01 to 1.5% by weight, based on polyesters and polyester urethanes, of a benzohydroquinone of formula (I) or naphthohydroquinone of formula (II)

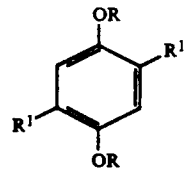
(I)

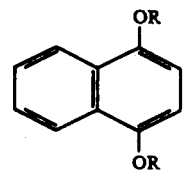
(II)

wherein R is hydrogen or $C_1$–$C_4$ alkyl and $R^1$ is $C_1$–$C_4$ alkyl.

* * * * *

UNITED STATES PATENT AND TRADEMARK OFFICE
CERTIFICATE OF CORRECTION

PATENT NO. : 5,130,360

DATED : July 14, 1992

INVENTOR(S) : Volker Ullrich

It is certified that error appears in the above-identified patent and that said Letters Patent is hereby corrected as shown below:

On the title page, item (75) inventors should read --Volker Ullrich--.

Signed and Sealed this

Seventeenth Day of August, 1993

Attest:

BRUCE LEHMAN

Attesting Officer          Commissioner of Patents and Trademarks